March 3, 1936. P. J. FLAMMANG 2,032,690
VEHICLE WINDOW WITH VENTILATOR SECTIONS
Filed Jan. 17, 1934 2 Sheets-Sheet 1

Inventor
PETER J. FLAMMANG
By Owen H. Spencer
Attorney

March 3, 1936.   P. J. FLAMMANG   2,032,690
VEHICLE WINDOW WITH VENTILATOR SECTIONS
Filed Jan. 17, 1934   2 Sheets-Sheet 2
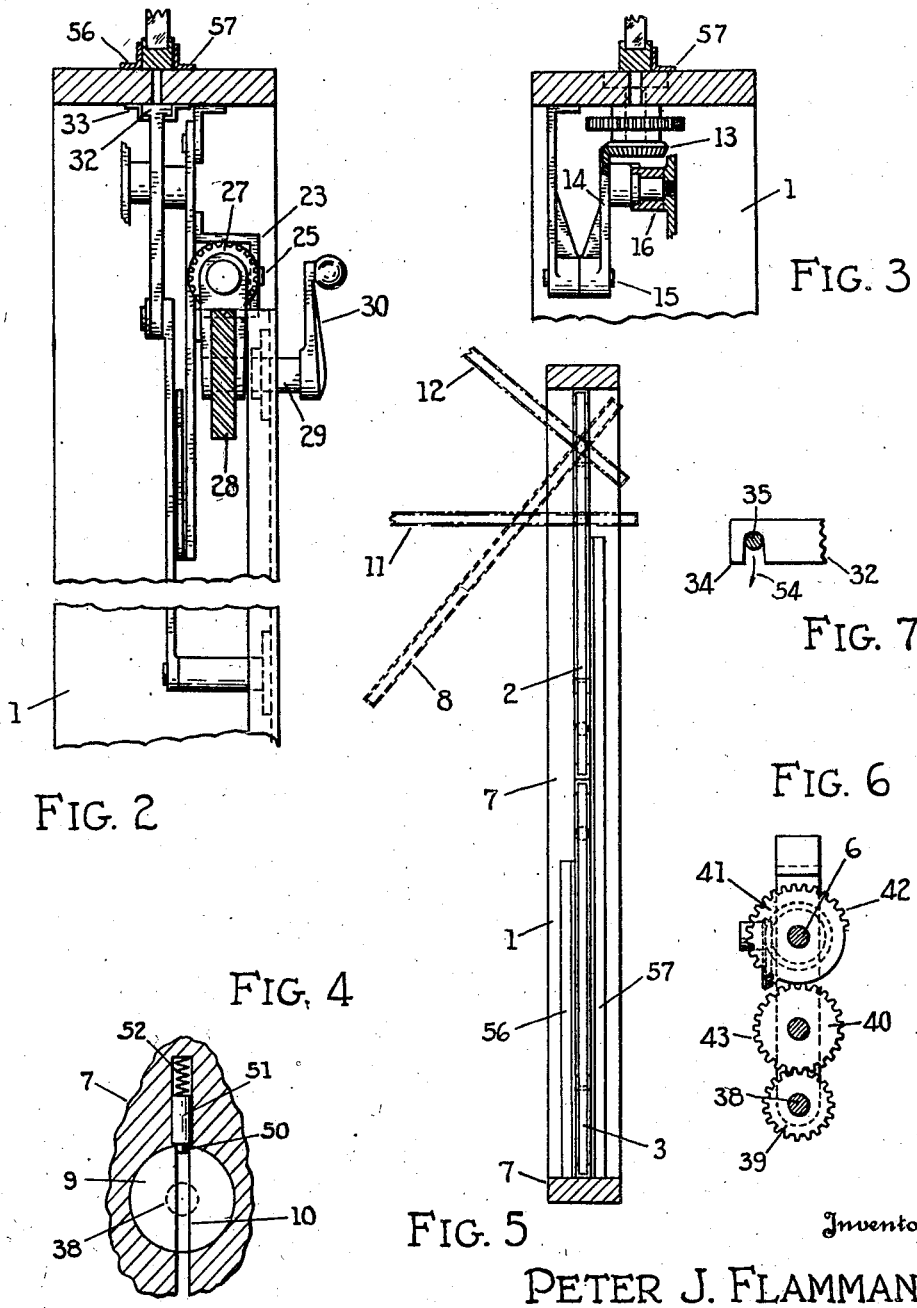

Patented Mar. 3, 1936

2,032,690

UNITED STATES PATENT OFFICE 2,032,690

VEHICLE WINDOW WITH VENTILATOR SECTIONS

Peter J. Flammang, Beech Grove, Ind.

Application January 17, 1934, Serial No. 706,919

3 Claims. (Cl. 296—44)

The invention relates to windows having foldable and slidable window sections, more particularly to the windows of closed-vehicle doors and especially to vehicle door windows the adjustable transparent sections of which are readily converted to a means of stimulating the ventilating movement of air through the interior of the vehicle during the overland movement of same; and the invention consists substantially in the construction, combination and arrangement of elements hereinafter pointed out and recited more particularly in the claims.

It is a primary object of the invention to provide a vehicle window with movable sections and means to convert such sections to a ventilating mechanism by motion transmitted from a single source.

It is also a primary object to provide a vehicle window having two movable sections, one of which is rotated to ventilating position, and the other of which is both slid to rotatable position, and then rotated during the rotation of the first section.

The above and other objects are attained by the construction and arrangement of parts hereinafter explained in connection with the accompanying drawings, in which:

Fig. 2 is a cross-sectional view taken in the proximity of line 2—2 of Fig. 1;

Fig. 3 is a detail cross-sectional view taken in the proximity of line 3—3 of Fig. 1;

Fig. 4 is a detail cross-sectional view taken in the proximity of line 4—4 of Fig. 1;

Fig. 5 is a cross-sectional view taken in the proximity of line 5—5 of Fig. 1;

Fig. 6 is a detail sectional view taken in the proximity of line 6—6 of Fig. 1; and, Fig. 7 is a detail sectional view taken in the proximity of line 7—7 of Fig. 1.

Similar characters of reference designate similar parts throughout the several views.

Figure 1:
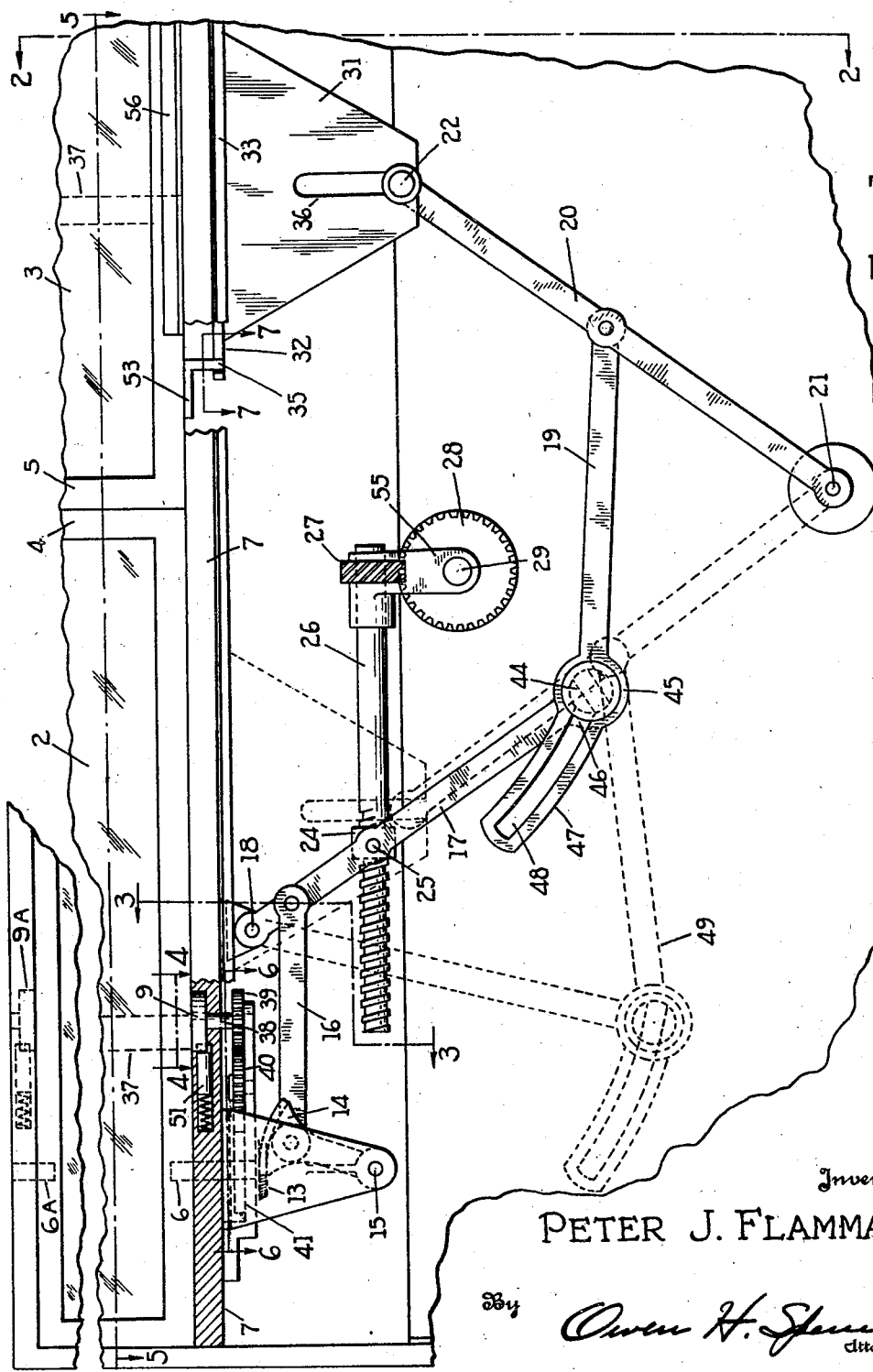
Figure 1 is a fragmentary side view of the mechanism, shown partly in section and serving as a movement diagram of the window operating mechanism.

Referring to Fig. 1 the numeral 1 indicates a portion of the vehicle door, the window thereof consisting of the forward glass section 2 and the rearward glass section 3, which are provided with metallic frames 4 and 5, respectively. The forward section 2 is adapted to be turned on the trunnion 6 which journals downwardly through the window sill 7, and another corresponding trunnion 6A positioned directly over the trunnion 6, and which is secured to the upper edge of said forward section and pivoted in the upper door structure. Said section is thus first swung on said trunnions into the position indicated by the dotted lines 8 of Fig. 5.

The rearward section 3 is slid toward the forward section 2, on the window sill 7 during the initial turning movement of the forward section 2, and until the forward corner of said rearward section slides onto the turn-table 9 between the guides 10. A corresponding inverted turn-table 9A is pivoted directly over the turn-table 9 in the upper door structure and the upper forward corner of said rearward section slides under same between the guides thereof. Said rearward section is then turned between said turn-tables to a position indicated by the dot-and-dash lines 11, while the forward section 2 is turned from the position indicated by the dotted lines 8 to the position indicated by the dot-and-dash lines 12.

The trunnion 6 extends from the forward section 2 downwardly through the sill 7 in which it journals. The lower end of said trunnion mounts the bevel gear 13, and the bevel gear quadrant 14 meshes therewith said gear quadrant being journaled upon the stud 15. The substantially horizontal connecting link 16 is pivoted to a medial point of said quadrant, and to the lever 17 below its fulcrum 18, the lower or free end of the lever 17, being pivoted to one end of the connecting rod 19 the other end of which is pivoted to a midway point of the lever 20. Said lever 20 is pivoted to the vehicle door structure at a point 21 below its connection with the connecting rod 19, and the other or free end of the lever 20 is provided with a stud 22 parallel to the axial line of the pivotal connection 21.

Between the free end of the lever 17, and its fulcrum 18, the U frame 23 is secured as shown in Fig. 2, to the side of the lever 17, and the threaded nut 24 is trunnioned to said lever and frame, by its trunnion 25. One end of the substantially horizontal screw 26 operates in free-threaded relation with said nut and the other or rearward end of said screw mounts the worm gear 27 which meshes with the worm 28. Said worm 28 is in turn mounted on one end of the shaft 29, which journals through the vehicle door structure, and the inner end of which protrudes interiorly of the vehicle. Said inner shaft end carries its operating crank 30, which is within convenient reach of the vehicle occupant.

The forward window section 2 is rotated into the position indicated by the dotted lines 11, as desired by rotation of the crank 30, motion being transmitted from said crank to the worm 28, the wormwheel 27, the screw 26, the nut 24, the lever 17, the connecting link 16, the quadrant gear 14, the bevel gear 13, and trunnion 6, in order as stated.

For shifting the rearward window section 3, a puller for same is provided in the form of the vertical plate 31. Said plate is concealed on all sides by the door structure and is suspended in substantially the same plane as said rearward section, directly below the sill 7. The horizontal slides 32 are formed along the upper edge of said plate, parallel to the lower edge of said rearward section, and form a T iron construction with said plate. Said slides are engaged by the gib like guides 33 secured to the under surface of the sill 7, and said plate is thus guided in forward and rearward movement. The slides 32, extend forwardly of the plate 31, and form the hook 34, as best illustrated in Fig. 7, the open side of which is outwardly disposed, considering the vehicle as a whole, and a stud 35 secured to said rearward section, extends downwardly therefrom normally into engagement with said hook, by which arrangement it will be understood that shifting of the plate 31 in the guides 33, will correspondingly shift said rearward window section by engagement of said hook with the stud 35.

To thus shift said rearward section by means of the plate 31 a vertical slot 36 is formed in same the sides of which straddle the stud 22, carried by the lever 20, as above described, and as the lever 17 is swung in rotating the forward window section 2, the lever 20 is swung thereby through the connecting rod 19, and the stud 22 and plate 31, being correspondingly shifted forwardly, it will be obvious that the rearward section 3 is shifted to the position indicated by the dotted lines 37 during the period the forward section 2 is rotated to a position indicated by the dotted lines 8.

As above indicated the rearward window section 3 slides onto the turn-table 9, as it reaches its most forward position, and said section is confined laterally between the guides 10 of said turn-table, and by the corresponding guides of the turn-table 9A. Having reached the end of its forwardly sliding movement said rearward section is rotated by the turn-table 9, into a position indicated by the dot-and-dash lines 11, said turn-table 9, being journaled by its downwardly extending spindle 38, which extends downwardly through the adjacent part of the window sill 7.

For rotating said turn-table, the spur gear 39 is mounted on the lower end of the spindle 38. Said spur gear meshes with the intermediate gear 40, which in turn meshes with the intermittent gear 41 which is mounted on the lower extremity of the trunnion 6. When the forward section 2 has been rotated to the position indicated by the dotted lines 8, the teeth 42 of the intermittent gear 41, engage the teeth 43 of the intermediate gear 40, and the rearward window section 3, having been slid onto the turn-table 9, said rearward section is swung thereby into the position indicated by the dot-and-dash lines 11, while said forward section is rotated from the position indicated by the dotted lines 8 to the position indicated by the dot-and-dash lines 12.

To carry out the final turning movement of said forward section by the screw 26 through the lever 17 which is coupled to the lever 20 by means of the connecting rod 19, and without continued sliding movement of the plate 31, the pivotal connection between said connecting rod, and the lever 17 is comprised of a flat sided stud 44 secured to the lever 17, the connecting rod 19 forming a female mating pivot head 45 bearing on said stud 44. A vacancy 46, however, is provided in said pivot head of suitable size, and suitable location to permit said stud to pass edgeways therethrough, when said rearward section has reached the end of its forward travel, and when said stud has been correspondingly rotated by the lever 17, by which feature said stud continues its movement through said vacancy with said lever 17, without further movement of the connecting rod 19, the lever 20, the plate 31, and the hook 34, and to further adapt the lever 17, and connecting rod 19 to this working relation, a slotted extension 47 is formed on said connecting rod the slot 48 of which is a continuation of the vacancy 46. Said slot is curved about the pivot 18 of the lever 17 as considered when the said connecting rod and said lever are in the position indicated by dotted lines 49 shown in Fig. 1, by which arrangement said slot serves to feed said stud back into pivotal relation with the head 45, at the end of the reverse movement of said stud through said slot, and when the intermittent gear 41 has rotated the driven gear 40 reversely into non-rotation position.

Referring to Fig. 1 in view of Fig. 4, the turn-table 9 is provided with a notch 50 in the forward side thereof, said notch being in line with the sliding path of the rearward window section 3. A plunger 51 is slidably disposed in the structure of the sill 7 suitably to be maintained, one end in engagement with the notch 50 during the sliding movements of said rearward section, the expansion coil spring 52 being tensioned against the other end of said plunger and tending to constantly force said plunger in said notch, and normally keep the turn-table guides 10 in line with said rearward section. The guides 10 of the turntables 9 and 9A are flush with the upper surface of the sill 7 and the lower surface of the corresponding above door structure, and therefore do not protrude into the path of rotation of the forward section 2; and the parts of said rearward section which engage the guides 10 of the turn-tables 9 and 9A, respectively, extend below and above the section proper in the form of keys 53; and said keys pass between the guides 10 sufficiently close to the floor of the turn-table 9 to strike the upper rearward corner of the plunger 51, and push same out of engagement with the notch 50, leaving said turn-table free to rotate with said rearward section as above described.

As above indicated said rearward window section is slid by the hook 32 of the plate 31 into rotating position, said hook engaging the stud 35 of said section. When, however, said section is rotated as above described said stud is swung out of engagement with said hook as indicated by the arrow 54 in Fig. 7, by which feature it will be understood that said section is automatically uncoupled and coupled with said plate to permit rotation of said section with the turn-table 9.

The rearward end of the screw 26, with the worm wheel 27, is journaled in the frame 55 which straddles the worm 28, and pivots floatingly over the shaft 29, by which arrangement it will be understood that said screw and worm wheel frame swing freely upon said shaft to follow the rise and fall of the nut 24 in accordance with the circular path determinable by the movement of said nut with the lever 17, about the fulcrum 18.

The rearward section 3 is guided in its sliding movement by the guide strips 56 and 57, which are secured to the window sill 7. The guide 56 extending a more limited distance forward, and being sufficiently short to clear said rearward section in the rotating movement thereof.

While the description and drawings illustrate in a general way certain instrumentalities which may be employed in carrying the invention into effect, it is obvious that many modifications may be made in the various details without departing from the scope of the appended claims, it being understood that the invention is not restricted to the particular examples herein described.

The invention claimed is:

1. In conjunction with vehicle windows, a window pane, a means to slide said pane from closed position to a partly open position, means to rotate said pane to open position from said partly open position, and means to automatically uncouple the means to slide from the means to rotate substantially at the beginning of the rotating movement.

2. In a vehicle window construction, a casing, a pane slidable in said casing, said pane having opposite end edges and opposite side edges each of which side edges has an independent guide engaging means spaced from both of said end edges and slidable with said pane, independent rotatable guides in the sliding path of each of said engaging means, said guides being trunnioned and entirely nested within the surface lines of said casing and being adapted to pivot said pane laterally when said engaging means are slid thereon, and means to slide said engaging means with said pane into engagement with said guides and rotate the same therewith at the will of the operator.

3. In a vehicle window construction, a casing, a pane, pivot means by which said pane is rotated to open and closed position in said casing, another pane slidable in said casing, said other pane having opposite end edges and opposite side edges each of which side edges has an independent guide engaging means spaced from both of said end edges and slidable with said other pane, independent rotatable guides in the sliding path of each of said engaging means, said guides being trunnioned in and entirely nested within the surface lines of said casing and being adapted to pivot said other pane laterally when said engaging means are slid thereon; and means to rotate the first pane and simultaneously slide said engaging means with said other pane into engagement with said guides and rotate the same therewith at the will of the operator.

PETER J. FLAMMANG.